United States Patent [19]

Appley

[11] 4,143,281
[45] Mar. 6, 1979

[54] VEHICLE FOR THE HANDICAPPED

[76] Inventor: Robert J. Appley, 902 Birch Ave., Shelby, Mont. 59474

[21] Appl. No.: 794,822

[22] Filed: May 9, 1977

[51] Int. Cl.$^2$ .............................................. B60J 1/10
[52] U.S. Cl. ................................... 296/146; 414/921
[58] Field of Search ............... 296/146; 214/DIG. 13, 214/77 R, 450; 49/37, 142, 143

[56] References Cited

U.S. PATENT DOCUMENTS

| | | | |
|---|---|---|---|
| 2,700,569 | 1/1955 | Koefoed | 296/146 |
| 3,861,739 | 1/1975 | Kinney | 296/146 |
| 3,874,527 | 4/1975 | Royce | 214/DIG. 13 |
| 3,896,741 | 7/1975 | Chapman | 49/37 |

Primary Examiner—Robert R. Song
Attorney, Agent, or Firm—Arthur L. Urban

[57] ABSTRACT

A vehicle having a body with a door frame and a door assembly, the door assembly including three movable sections, an upper section horizontally slidable along a side of the vehicle from a position within the door frame to a position outside of the door frame, a center section having a longitudinal channel along its top edge to receive the bottom edge of the upper section and the bottom edge of the center section being pivotally connected to the top edge of a lower section, the bottom edge of the lower section being pivotally connected to the bottom edge of the door frame, biasing means connecting the center section and the lower section adjacent one side edge thereof, flexible connecting means attached adjacent a top corner of the lower section, and actuating means operatively connected to the flexible connecting means.

7 Claims, 11 Drawing Figures

VEHICLE FOR THE HANDICAPPED

This invention relates to a vehicle capable of being operated by a physically handicapped person and more particularly relates to a vehicle providing independent transportation capability for a wheel chair bound individual.

A major effort is underway in the United States to reduce the logistic problems of physically handicapped persons. For example, new buildings are being built with wider doors and ramps to accommodate wheel chairs, and existing buildings are remodeled to provide such facilities. Buses are now being offered with lifts for wheel chairs. Also, cities are replacing curbs at intersections with ramps to simplify movement of wheel chairs from the street to the sidewalk.

However, one area in which little has been done is that of vehicles for physically handicapped individuals. The handicapped have had to arrange personally for the modification of conventional vehicles to enable them to drive. These modifications usually are makeshift in nature and often marginally acceptable. For example, a lift may be added on the side or back of a van, but such lifts are not convenient to operate and occupy considerable space. Also, hand operated extensions can be added to the brake and throttle pedals to permit operation of a vehicle without the use of the feet. These extensions often are cumbersome to operate and require considerable dexterity.

A further problem is the safety of a wheel chair bound driver within the vehicle in the event of an accident. It has been proposed to use safety belts and harnesses on the wheel chair and the occupant, but this is not acceptable since wheel chairs are not designed to take the forces imposed by the forward movement of a human body in case of a front end collision. The use of belts and harnesses around the chair and driver also is not desirable since in a rollover the weight of the chair may be added to the driver's weight that is bearing against the belts, thereby making release of the belts practically impossible. Another objection to the use of belts is the difficulties some physically handicapped persons have in manipulating and latching such devices.

Thus, it is apparent that simple solutions to the problems of entry and exit, driver operating controls and occupant safety are not available to wheel chair bound drivers who desire independent transportation capability.

The present invention provides a novel vehicle which permits convenient and safe independent operation by a wheel chair bound person. Entry and exit of the vehicle can be achieved with the wheel chair without the need for a lift. Also, entry and exit of a wheel chair is convenient even from surfaces of different elevations. In addition, entry and exit can be accomplished without assistance from others.

Other benefits and advantages of the present invention will be apparent from the following description and the accompanying drawings in which.

Figure 1:
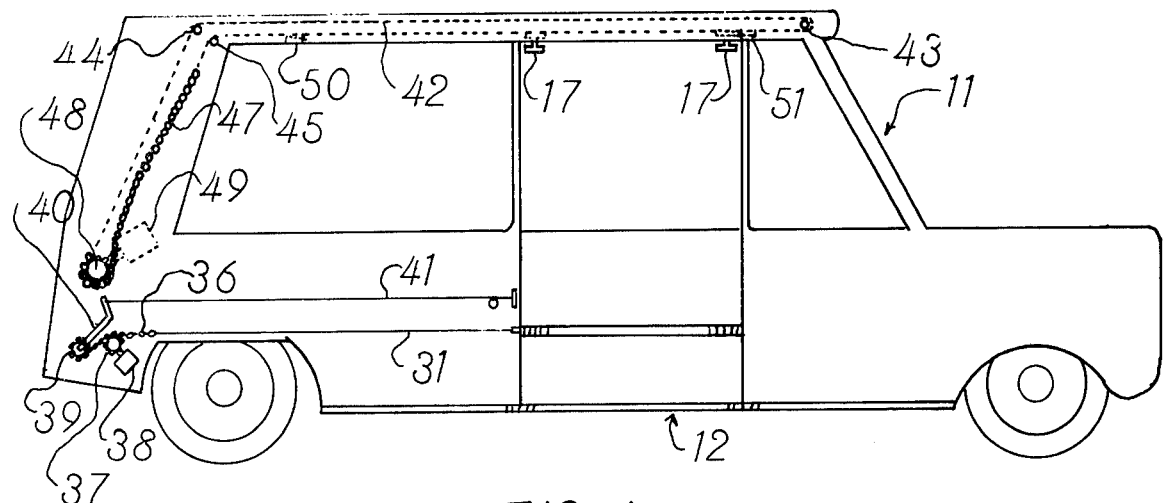
FIG. 1 is a side elevation of one embodiment of a novel vehicle of the invention.
Figure 2:
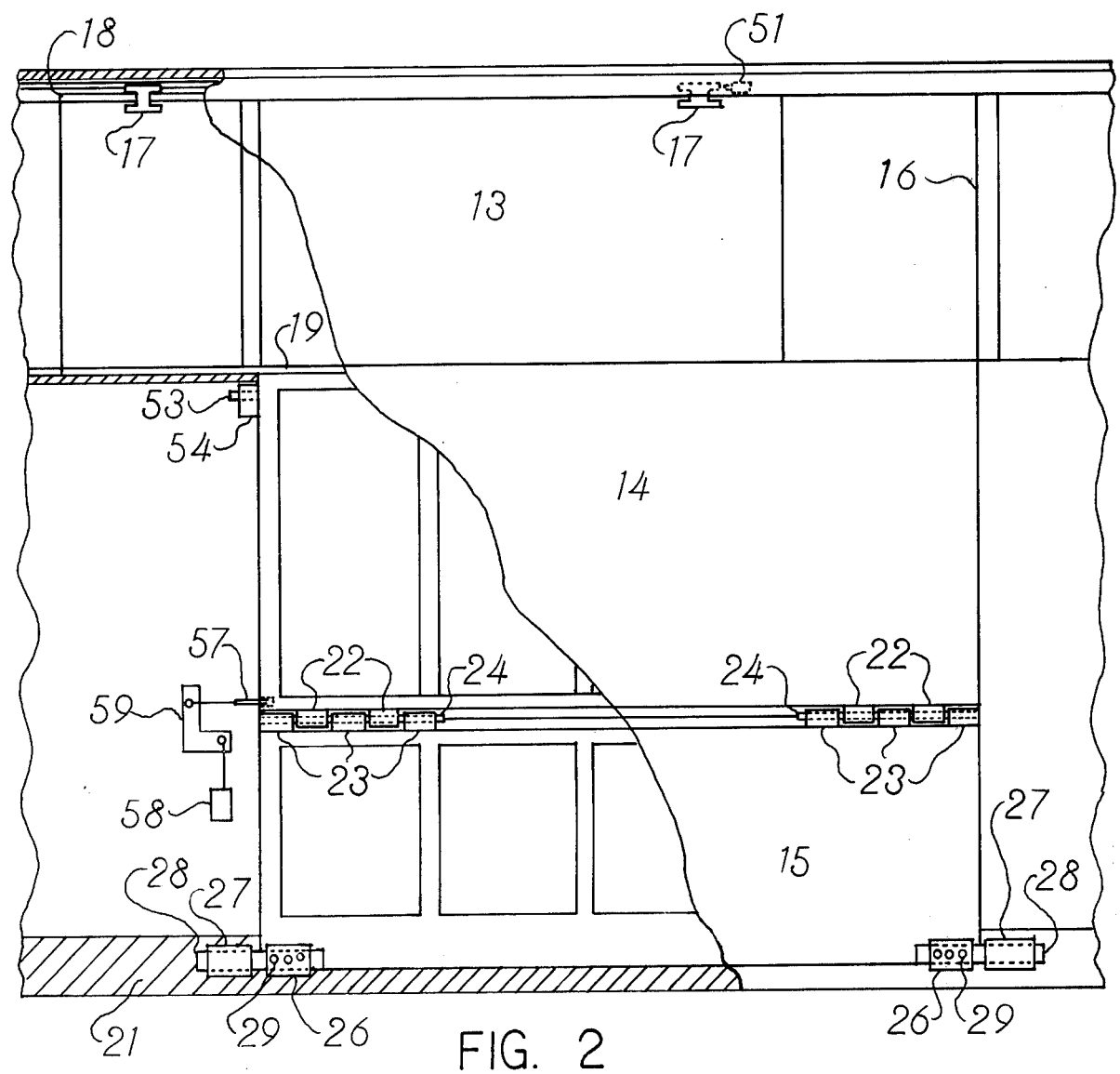
FIG. 2 is an enlarged side elevation partially in section of a novel door assembly of the vehicle shown in FIG. 1.

As shown in FIGS. 1-7 of the drawings, a vehicle 11 has a door assembly 12 with an upper glass section 13, a center section 14 and a lower section 15. Glass section 13 is suspended on hangers 17 below an overhead track 18. Track 18 is affixed along the side of vehicle 11 above the door frame 16 and extends rearwardly at least an equal distance to permit the glass section 13 to clear the door frame. The lower edge of glass section 13 is disposed within a channel 19 in the top of center section 14.

Center section 14 is pivotally connected to the lower section 15 which in turn is pivotally connected to peripheral frame 21 of vehicle 11. The pivotal connection between center section 14 and lower section 15 is achieved through a hinge arrangement including spaced sleeves 22 welded on the bottom edge of the center section 14 near each side edge of the section and spaced sleeves 23 welded on the upper edge of the lower section 15 near each side edge of the section. The sleeves 22 are spaced a distance equal to the length of the sleeves 23 so that the sleeves 22 and 23 will mate to form continuous passages for hinge pins 24.

The pivotal connection between lower section 15 and the frame 21 includes sleeves 26 welded at the bottom edge of lower section 15 near each side edge of the section and sleeves 27 welded to the frame 21 near each side of the door frame 16. Hinge pins 28 are affixed within sleeves 26 by suitable fasteners 29 and extend through sleeves 27.

Figure 7:
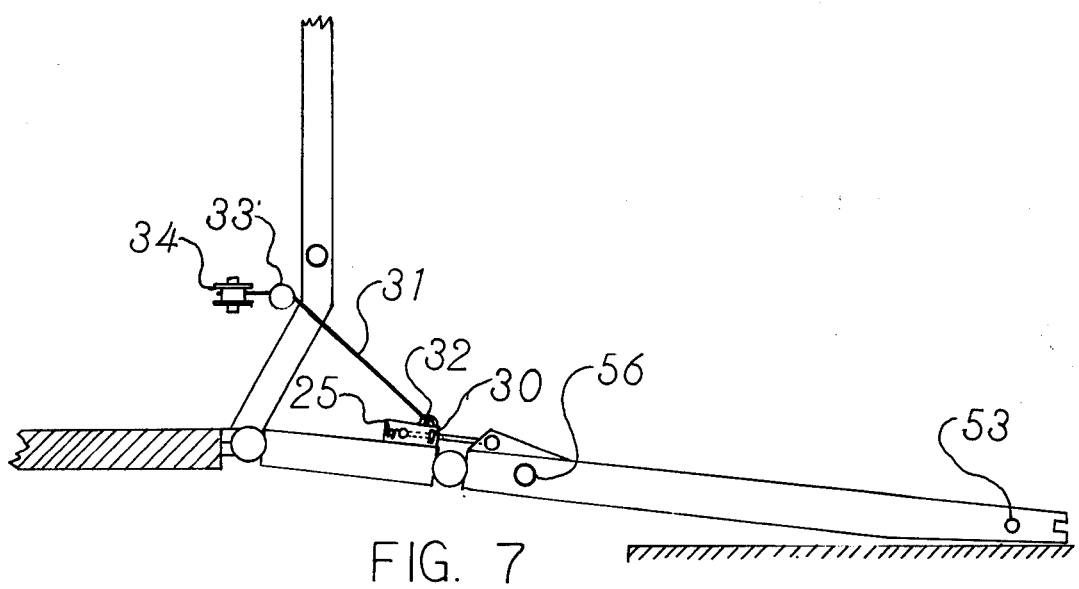
FIG. 7 is an edge view of the door assembly shown in FIG. 2 in an open position in contact with the surface on which the vehicle is standing.
Figure 8:
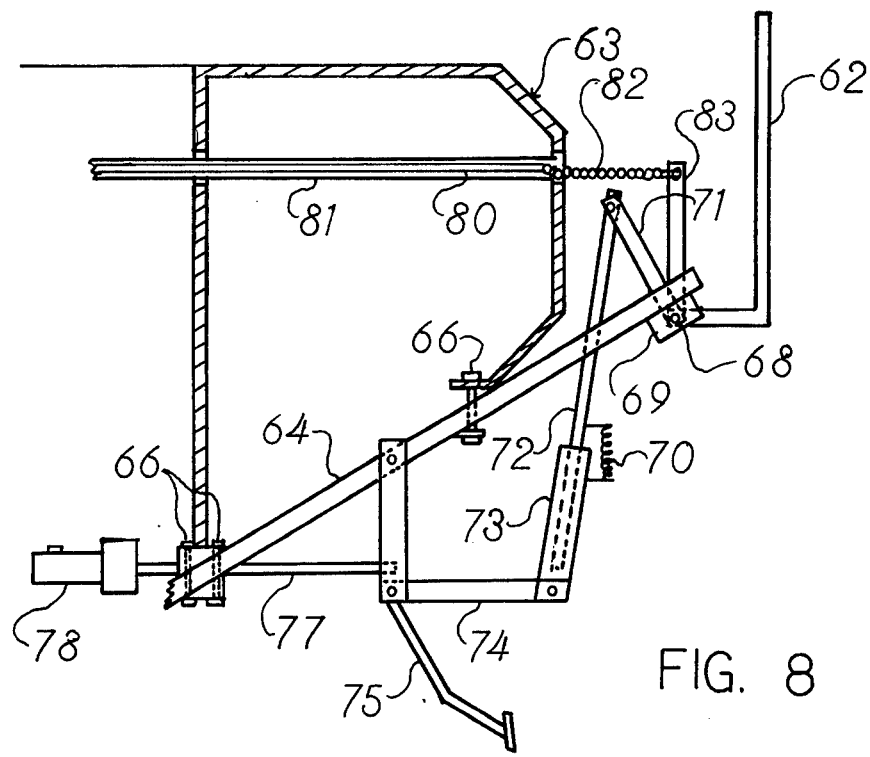
Figure 9:
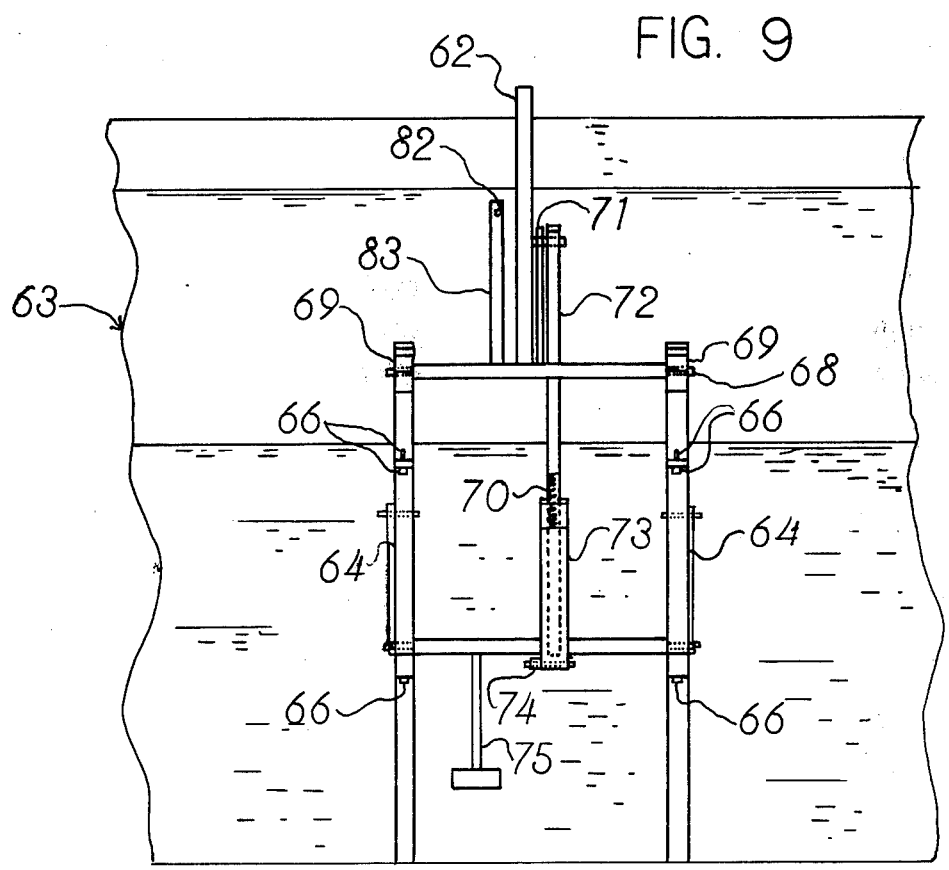
Figure 11:
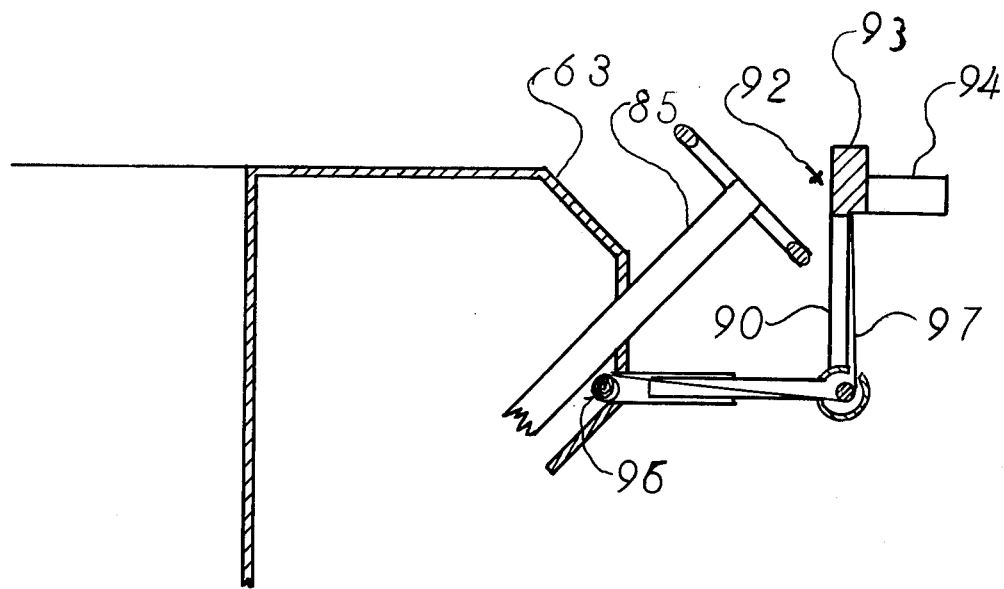
Figure 10:
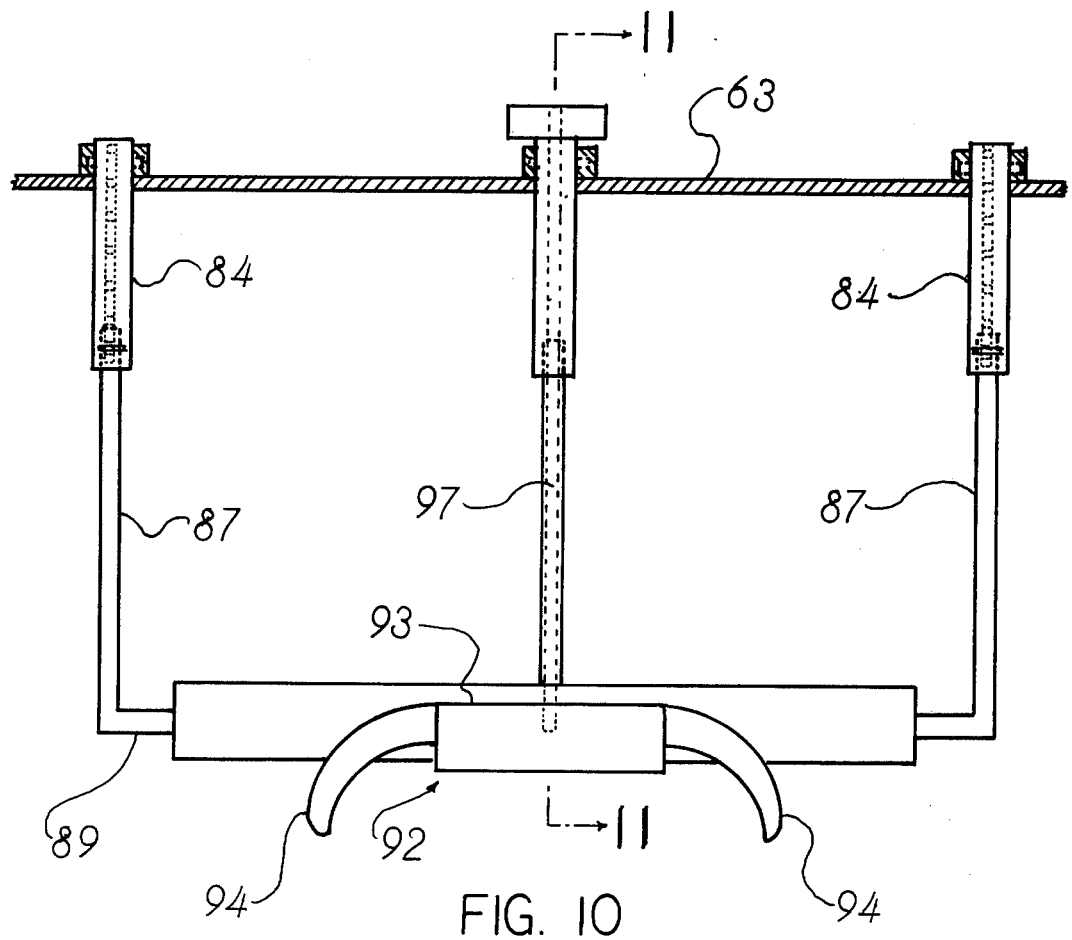

As shown particularly in FIG. 7, a coil spring 25 has a straight portion at one end which is connected between suitable brackets which are located on either side of the hinge area of sections 14 and 15. An adjustable stop 30 is disposed on the straight portion of the spring 25 to restrict the maximum angle between sections 14 and 15.

Movement of the door assembly 12 is achieved by a control system including a cable 31, one end of which is secured to an upper corner 32 of lower section 15. Cable 31 passes over a pulley 33 located inside the vehicle 11 and over a second pulley 34 positioned perpendicular to pulley 33. The opposite end of cable 31 is attached to a chain 36 which engages sprocket 37 driven by a reversible motor 38. Chain 36 is wrapped around a spring loaded take-up drum 39. Drum 39 is mounted on a bell crank 40 which may be actuated by cable 41 to separate sprocket 37 from chain 36 for manual operation of the door assembly 12.

Movement of glass section 13 of door assembly 12 is effected by a control system including cable 42 which is attached to glass section hangers 17. Cable 42 passes around rollers 43, 44 and 45 and the ends are attached to the ends of a chain 47 which engages sprocket 48 driven by a reversible motor 49. Means (not shown) may be provided to disengage chain 47 from sprocket 48 as described above for chain 36 and sprocket 37, to permit manual operation of glass section 13.

The motors 38 and 49 normally are operated in sequence with appropriate circuitry and actuating switches (not shown). A switch may be located at the driver's controls and an external switch, e.g. a key switch, may be located outside the vehicle at a point convenient for use by the handicapped individual. The circuitry may include suitable limit switches 50 and 51 so that in opening of the door assembly 12 motor 49 will not be activated until glass section 13 has moved completely from door frame 16 and in closing the door assembly, motor 38 will not be activated until channel 19 of center section 14 is properly positioned to receive the bottom edge of glass section 13.

Door assembly 12 is maintained in a tightly closed position by a latch including a pin 53 extending from an upper corner of one side edge of section 14. Pin 53 engages a slot in bracket 54 attached to door frame 16. A lower corner of the side edge of section 14 has an opening 56 into which a sliding bolt 57 may be inserted. Sliding bolt 57 may be actuated by a suitable mechanism such as solenoid 58 and bell crank 59.

In the operation of the novel door assembly of the vehicle of the invention as shown in FIGS. 1–7 of the drawings, a wheel chair bound individual may insert a key into a switch (not shown) which initiates the operation of motor 49, driving sprocket 48 and drawing chain 47 past the sprocket. The movement of chain 47 advances cable 42 attached thereto around rollers 43, 44 and 45. Since glass section is attached to cable 42 through hangers 17, the glass section will slide along overhead track 18 to a position which is clear of the door frame 16. This movement also retracts the bottom of glass section 13 from channel 19 in the top of center section 14.

Figure 3:
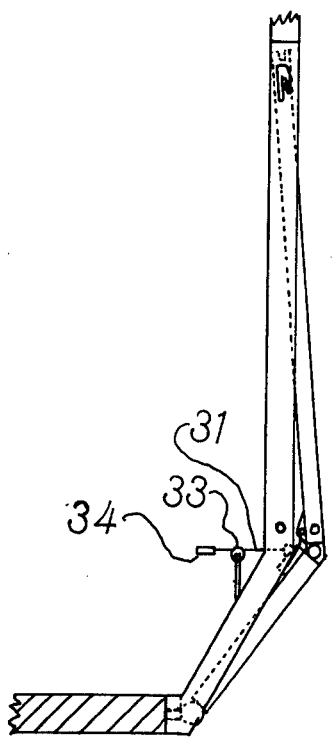
FIG. 3 is an edge view of the door assembly shown in FIG. 2 as the door is beginning to open.
Figure 4:
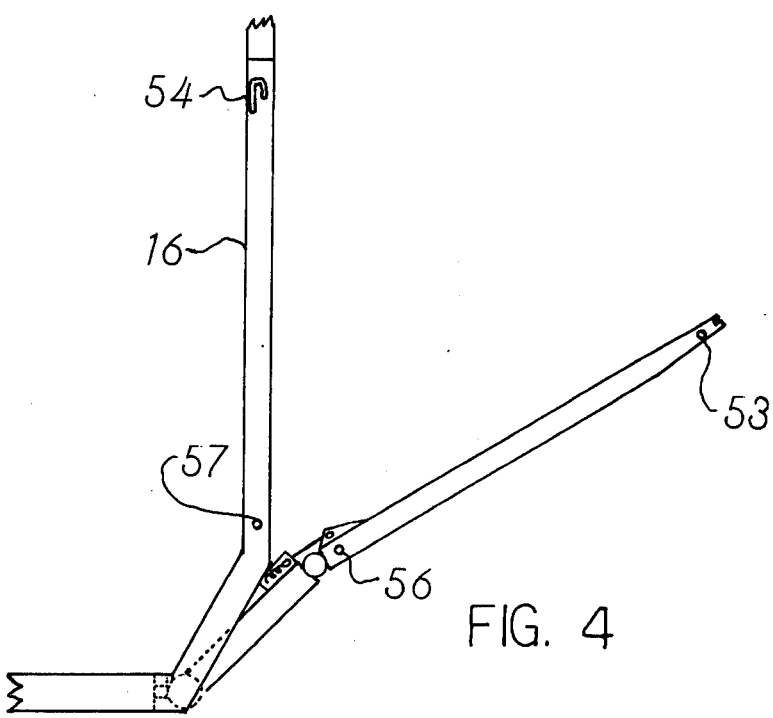
FIG. 4 is an edge view of the door assembly shown in FIG. 2 intermediate its open and closed positions.
Figure 5:
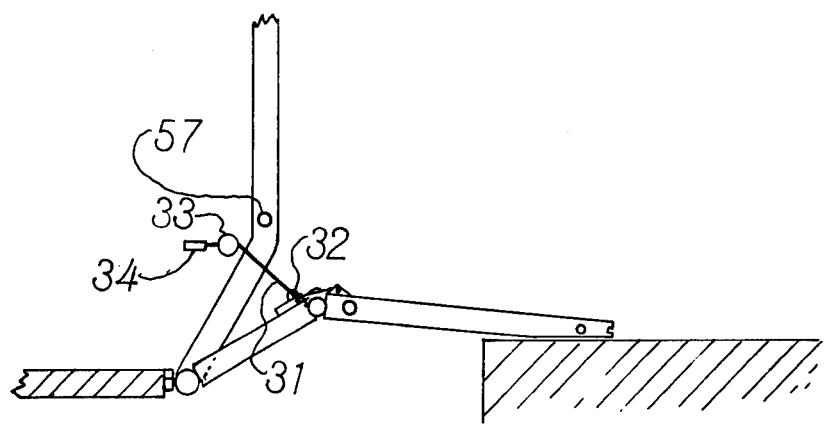
FIG. 5 is an edge view of the door assembly shown in FIG. 2 in an open position in contact with a relatively high curb surface.
Figure 6:
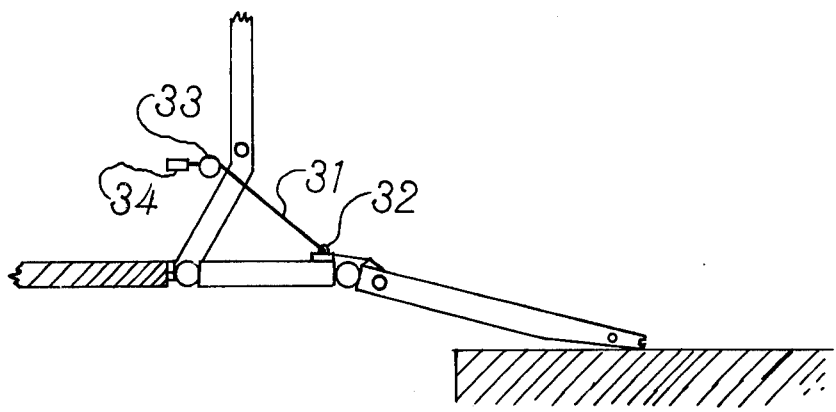
FIG. 6 is an edge view of the door assembly shown in FIG. 2 in an open position in contact with a relatively low curb surface.

When glass section 13 reaches its fully retracted position, it will contact an appropriate switch 50 actuating solenoid 58 and drawing bolt 57 from opening 56. Then, motor 38 will be activated, driving sprocket 37 and drawing chain 36 from drum 39. The movement of chain 36 will release cable 31 so that as shown in FIG. 3, the tension in coil spring 25 and the weight of section 15 and section 14 hinged thereto will cause the sections to move away from the door frame 16. As the sections 14 and 15 are lowered, the weight of section 14 will overcome the tension in spring 25 causing section 14 to pivot with respect to section 15, as shown in FIG. 4. The sections 14 and 15 are lowered further as motor 38 releases chain 36 and cable 31 attached thereto until the edge of section 14 contacts the desired surface, e.g. a raised sidewalk as shown in FIGS. 5 and 6 or a roadway as shown in FIG. 7. When the lowered sections 14 and 15 have reached the desired position, the driver will release the key switch and move himself in the wheel chair over the ramp formed by sections 14 and 15 into the vehicle. Advantageously, the upper edge of section 14 is tapered to facilitate passage of the wheel chair onto the ramp.

To close the door after the driver is within the vehicle, the driver can actuate a switch (not shown) on the dash or other appropriate location within the vehicle. This will reverse motor 38 and sprocket 37 to draw chain 36 toward spring loaded drum 39 on which it will be wound. This movement will cause cable 31 to lift sections 14 and 15 upward. As section 15 approaches an upright position, spring 25 will draw section 14 toward an upright position with pin 53 below slotted bracket 54. Further pull on cable 31 will draw the sections 14 and 15 tightly against door frame 16 with pin 53 in slot 54 and opening 56 opposite bolt 57. Activation of solenoid 58 will move bolt 57 into opening 56 and lock the sections 14 and 15.

Motor 49 is then activated to drive sprocket 48 in a reverse direction causing chain 47 and cable 42 to advance glass section 13 forward along track 18 into a position above section 14 and closing the door assembly 12. When the driver wishes to exit from the vehicle, he actuates the switch inside the vehicle, activating motors 38 and 49 and solenoid 58 in the proper sequence to retract glass section 13, unlock and lower the sections 14 and 15 to form a ramp for passage of the wheel chair from the vehicle. The door assembly then is closed and locked by actuating the switch which again activates motors 38 and 49 and solenoid 58 in the proper sequence.

The above description and the accompanying drawings show that the present invention provides a novel vehicle which fulfills the independent transportation needs of physically handicapped persons. Further, the vehicle of the invention provides convenience and safety features for wheel chair individuals which heretofore were not available. The vehicle includes a novel door assembly which functions as an entry and exit ramp. Moreover, entry and exit can be achieved easily from high and low curbs. Also, the door can be operated by the individual without assistance from others.

It will be apparent that various modifications may be made in the novel vehicle and the door assembly, operating controls and restraint system thereof described in detail above and shown in the drawings. For example, the upper glass section of the door assembly may be replaced with a metal or plastic section. Therefore, the invention is to be limited only by the following claims.

What is claimed is:

1. A vehicle having a body with a door frame and a door assembly, said door assembly including three movable sections, an upper section horizontally slidable along a side of said vehicle from a position within said door frame to a position outside said door frame; a center section having a longitudinal channel along its top edge to receive the bottom edge of said upper section and the bottom edge of said center section being pivotally connected to the top edge of a lower section; the bottom edge of said lower section being pivotally connected to the bottom of said door frame; biasing means connecting said center section and said lower section adjacent one side edge thereof; flexible connecting means attached adjacent a top corner of said lower section and actuating means operatively connected to said flexible connecting means.

2. A vehicle according to claim 1 wherein said upper section of said door assembly is transparent.

3. A vehicle according to claim 1 wherein said upper section of said door assembly includes hangers mounted adjacent its top edge slidable along an overhead track disposed along a side of said vehicle.

4. A vehicle according to claim 1 wherein said upper section of said door assembly is moved by a drive mechanism including a motor driven sprocket and chain.

5. A vehicle according to claim 1 wherein said center section is tapered toward its top edge.

6. A vehicle according to claim 1 wherein said actuating means includes a motor driven sprocket, a chain, a spring-loaded drum and a bell crank for separating said chain and sprocket.

7. A vehicle according to claim 1 wherein said door assembly includes a pin and slot latching means adjacent the top edge of said center section and a sliding bolt locking means adjacent the pivot connection between said center section and said lower section.

* * * * *